United States Patent Office 3,233,004
Patented Feb. 1, 1966

3,233,004
PROCESS FOR THE OXIDATION TO CARBON DI-
OXIDE OF CARBON MONOXIDE IN AN OLEFIN-
CONTAINING GAS MIXTURE
Joseph Hirschbeck and Freimuth Lohöfer, Burgkirchen,
Upper Bavaria, Germany, assignors to Farbwerke
Hoechst Aktiengesellschaft vormals Meister Lucius &
Bruning, Frankfurt am Main, Germany, a corporation
of Germany
No Drawing. Filed Nov. 5, 1962, Ser. No. 235,521
3 Claims. (Cl. 260—677)

The present invention relates to a process for the oxidation to carbon dioxide of carbon monoxide in an olefin-containing gas mixture which contains small amounts of said carbon monoxide.

This application is a continuation-in-part application of our application Serial No. 27,241 filed May 6, 1960, now abandoned, for "Process for the Removal of Carbon Monoxide From Olefin-Containing Gas Mixtures" which in turn is a continuation-in-part application of our application Serial No. 658,517, filed May 13, 1957, being now abandoned.

Solutions of salts of monovalent copper are capable of absorbing unsaturated compounds, especially carbon monoxide and olefinic gases by forming coordination compounds. The formation of such coordination compounds is reversible, i.e. by reversing the temperature and pressure conditions the absorbed gases can again be desorbed from the solutions. In industry, this property of the cuprous salt solutions is utilized in numerous processes of gas purification and separation, for example for removing carbon monoxide from the synthesis gas originating from the manufacture of ammonia, for separating olefins from a mixture containing olefins and paraffins or for obtaining butadiene from $C_4$-hydrocarbon mixtures.

When the absorption process with cuprous salt solutions is used for gas mixtures containing simultaneously carbon monoxide and olefins, as obtained for example in the pyrolysis of hydrocarbons, carbon monoxide and the olefins are both absorbed by the solution. Considering the absorption power of cuprous salt solutions for the individual gases to be absorbed, carbon monoxide has the highest absorption coefficient, while the absorption coefficient of the olefins decreases with the increasing molecular weight. Thus, for physical reasons it is not possible to obtain an olefin which is free from carbon monoxide in an economical manner with a satisfactory purity by subjecting the solution charged with carbon monoxide and olefins to a fractional release or by stripping it with a pure olefin. The total amount of the gas mixture is, therefore, separated in a physical way by a deep temperature distillation or the mixture of carbon monoxide and olefins is first separated with the aid of a cuprous salt solution and this fraction of the gas mixture is then separated by a deep temperature distillation. In a chemical way the carbon monoxide can be separated from a mixture containing same and also olefins by a selective hydrogenation of CO to methane or by a selective oxidation of CO to carbon dioxide. A selective hydrogenation of CO is, however, impossible for thermodynamic reasons since the olefins yield the higher hydrogenation heat.

It is known for quite a while that carbon monoxide can be oxidized to carbon dioxide under the action of cupric ions. There has also been described the selective oxidation of carbon monoxide to carbon dioxide in the presence of ethylene in solutions containing salts of bivalent copper. However, the oxidation of carbon monoxide by means of bivalent copper requires very long residence times. And even then it is not quantitative so that this method is very complicated and little economical for industrial use. The said method comprises an absorption stage at low temperature and under high pressure, an oxidation stage for the carbon monoxide at elevated temperature and under high pressure in large vessels and a desorption by pressure release and with subsequent cooling of the copper salt solution.

Now we have found a process by which small amounts of carbon monoxide in an olefin-containing hydrocarbon mixture or in an already isolated high-percent olefin are oxidized to carbon dioxide which process consequently does not depend on the degree of the olefin content. The process according to the invention consists essentially in contacting an olefin-containing gas mixture which additionally contains carbon monoxide at an elevated temperature with an aqueous solution which contains in addition to a cupric salt also a cuprous salt in an amount being 30 to 90 percent by weight of the total copper content, so that the content of cupric (i.e. bivalent) copper is between 70 and 10% by weight of the total copper content. In addition to salts of bivalent copper the solution must initially contain considerable portions of cuprous compounds, namely in an amount which is far in excess of the cuprous content formed by the reaction of the cupric salt with the carbon monoxide. Obviously, the carbon monoxide is oxidized faster by the cupric ions in the presence of a considerable excess of cuprous salts. In the process of the present invention no absorption and desorption of any gases occur. The olefin containing small amounts of carbon monoxide passes through the copper salt solutions practically unchanged except the oxidation of the carbon monoxide content to carbon dioxide. Accordingly, a gas containing e.g. ethylene, inert constituents such as nitrogen or saturated hydrocarbons and carbon monoxide is changed in the present process only in its carbon monoxide portion which is quantitatively oxidized to carbon dioxide whereas all other constituents remain unchanged.

Preferably the copper shall be used in a concentration of 100 to 200 grams per liter, 60 to 90% being cuprous copper and the balance being cupric copper.

The process of the present invention can be carried out under any pressure. The temperature at which the process is carried out shall be at least 60° C. and should not exceed the boiling temperature of the solution under the pressure applied. If atmospheric pressure is applied the temperature is accordingly in the range between 60 and 100° C. This temperature range is critical for the present process since elevated temperatures are required for the successful operation of the process, particularly at atmospheric pressure. In case higher pressures are applied, it is also possible to operate at higher temperatures since under these elevated pressures the boiling point of the solution is also increased. However, when contacting equal portions (by weight) of gas at atmospheric or elevated pressure, lower temperatures than would be suitable at atmospheric pressure may also be applied for super-atmospheric pressures since the gases are better contacted with the solution and remain in contact longer with the solution. But it is especially advantageous to work under atmospheric pressure since in this case there exists a minimum of difficulties pertaining to apparatus.

With the known affinity of carbon monoxide to monovalent copper salts, it might have been expected that the carbon monoxide would be partially absorbed by the solution used in the present process. It was also to be expected that at least part of the olefins, which as is known also react with cuprous salts, would be lost by the treatment according to the invention. Practical tests proved, however, that in the process of the invention only immaterial amounts of olefins are lost.

The process according to the invention is suitably carried out similar to a washing process by contacting the olefin-containing gas mixtures in which the carbon monoxide has to be oxidized under any pressure in co- or counter-current with the aforesaid solutions.

The solutions according to the present invention can be acid, neutral or alkaline. There can be used solutions of hydrochloric acid as well as ammoniacal solutions. Especially useful are such solutions containing organic nitrogen bases, especially amines or hydroxyalkylamines, as phenetidine, piperidine, pyridine, ethanolamine, diethanolamine and propanolamine.

As copper salts there may be used any copper salts being soluble under the reaction conditions. Particularly suitable are copper halides such as copper chloride, especially when acid solutions are used. Further suitable copper salts are the nitrates, acetates, formates, sulfates and carbonates, the latter being preferred in solutions containing complex-forming ingredients such as amines or ammonia in order to keep them dissolved.

The copper salt solution used is oxidized by treating it in known manner with air or oxygen, preferably also at elevated temperature, which preferably is the same as in the carbon monoxide oxidation. The oxidation should preferably be carried out at the same pressure as the oxidation of the carbon monoxide.

The process according to the present invention is suitable for the treatment of gas mixtures in which the olefins are present in admixture with other gaseous substances and for the treatment of gas mixtures in which the olefins may be fairly concentrated, for example up to a content of nearly 100%. The process can, therefore, be carried through at any place in the working up of olefin-containing gas mixtures.

The following examples serve to illustrate the invention but they are not intended to limit it thereto:

*Example 1*

In a tube filled with Raschig rings and having an inside diameter of 50 mm. 80 liters per hour of a gas containing 40.4% by volume of ethylene and propylene and 2% by volume of carbon monoxide (the other constituents being hydrogen and saturated hydrocarbons) are passed, at atmospheric pressure and 90° C., through 300 cc. per hour of a hydrochloric acid copper salt solution containing per liter 120 grams of copper, half of which being present as monovalent and the other half as bivalent copper. The gas leaving the solution has exactly the same volume as that introduced into the solution and is free from carbon monoxide and contains 40.4% by volume of olefins and 2% by volume of carbon dioxide.

If a solution is used containing the same amount of copper of which, however, only up to about 5% are present in the monovalent form, the same effect can only be obtained with a considerably smaller throughput of gas.

*Example 2*

In a tube filled with Raschig rings and having an inside diameter of 50 mm. 80 liters per hour of a gas containing 40.4% by volume of ethylene and propylene and 2.0% by volume of carbon monoxide (the other constituents being hydrogen and saturated hydrocarbons) are passed at atmospheric pressure and 90° C. through 600 cc. per hour of a solution of cuprous and cupric nitrate in monoethanolamine containing per liter 180 grams of copper, 144 grams (=80%) being present as cuprous nitrate and 36 grams (=20%) as cupric nitrate. The gas leaving the tube has exactly the same volume as that introduced into the tube and is free from carbon monoxide and contains 40.4% by volume of olefins and 2.0% by volume of carbon dioxide. For the oxidation the copper salt solution is treated, without further heating, with air to an extent such that the indicated ratio of mono- and bivalent copper is readjusted. The liquor thus regenerated is recycled to the carbon monoxide oxidation stage, if necessary after having been reheated to 90° C.

If a solution is used containing the same amount of copper of which only up to about 5% are present in the monovalent form, the same effect can only be obtained with a considerably smaller throughput of gas.

When the carbon monoxide is removed from the same gas mixture in the same apparatus under identical conditions, with the exception that a pressure of 3 atmospheres and a temperature of 124° C. are applied, about the same results are obtained.

Similar results are obtained if, instead of monoethanolamine, phenetidine, piperidine, pyridine or propanolamine are used as the solvent for the copper salt.

We claim:

1. A process for liberating a gaseous mixture of olefins from small amounts of carbon monoxide by converting said monoxide into carbon dioxide, which comprises passing in a first stage said gaseous mixture through a solution containing as essential ingredients, a member selected from the group consisting of hydrochloric acid, ammonia, phenetidine, piperidine, pyridine, monoethanol amine and propanol amine, and as sole metallic compound at least one cupric salt and at least one cuprous salt, the ratio of the cupric copper to cuprous copper being in the range between 10 to 70% and 90 to 30%, at a temperature between 60° C. and the boiling point of said solution, treating the solution from the first stage in a second stage with a sufficient quantity of oxygen to reoxidize to cupric copper the cuprous copper formed in the reaction between carbon monoxide and cupric copper in the first stage, recycling the solution containing said reoxidized cupric copper into the first stage, and counteracting desorption of olefins during the second stage and adsorption of olefins during the first stage by maintaining pressure and temperature equal in both stages.

2. The process of claim 1, wherein the solution contains 100 to 200 grams per liter of copper, 60 to 90% of which being present as cuprous copper and the balance as cupric copper.

3. A process for liberating a gaseous mixture of olefins from small amounts of carbon monoxide contained in said mixture in an amount up to 2% by converting said monoxide into carbon dioxide, which comprises passing in a first stage said gaseous mixture at atmospheric pressure through a solution containing as essential ingredients, a member selected from the group consisting of hydrochloric acid, ammonia, phenetidine, piperidine, pyridine, monoethanol amine and propanol amine, and as sole metallic compound at least one cupric salt and at least one cuprous salt, the ratio of the cupric copper to cuprous copper being in the range between 10 to 70% and 90 to 30%, at a temperature between 60° C. and the boiling point of said solution, treating the solution from the first stage in a second stage with a sufficient quantity of oxygen to reoxidize to cupric copper the cuprous copper formed in the reaction between carbon monoxide and cupric copper in the first stage, recycling the solution containing said reoxidized cupric copper into the first stage and counteracting desorption of olefins during the second stage and adsorption of olefins during the first stage by maintaining pressure and temperature equal in both stages.

References Cited by the Examiner

UNITED STATES PATENTS

| | | | |
|---|---|---|---|
| 1,977,659 | 10/1934 | Watts | 260—677 |
| 2,005,500 | 6/1935 | Joshua et al. | 260—677 |
| 2,043,263 | 6/1936 | Porter | 23—2 |
| 2,047,550 | 7/1936 | Dely | 260—677 |
| 3,102,919 | 9/1963 | Hirschbeck et al. | 260—677 |

FOREIGN PATENTS 540,896  12/1931  Germany.

ALPHONSO D. SULLIVAN, *Primary Examiner.*